Patented Sept. 8, 1931

1,822,784

UNITED STATES PATENT OFFICE

LEOPOLD OSWALD, OF BASEL, SWITZERLAND, ASSIGNOR TO THE FIRM OF J. R. GEIGY S. A., OF BASEL, SWITZERLAND

MANUFACTURE OF MORDANT DISAZO DYESTUFFS

No Drawing. Application filed February 6, 1929, Serial No. 338,033, and in Germany February 20, 1928.

This invention relates to mordant disazo dyestuffs and has for its object production of such disazo dyestuffs yielding excellent results.

It has been found that mordant disazo dyestuffs with new and surprising results can be obtained by diazotizing mono- or disulphonic acids of hydroxyl-free amines of the napthalene series, coupling with 1-napthylamine-6- or 7-sulphonic acid to form an intermediate product, further diazotizing the latter and finally coupling with an ortho-hydroxycarboxylic acid of the benzene series.

It is particularly surprising that not only mono- but even disulphonic acids of hydroxyl-free amines of the napthalene series can be used to produce dyestuffs for printing that are excellent in every respect. Especially the fact is remarkable that these dyestuffs, as chromium lakes dyeing brown, yield prints which are entirely fast to soap and washing in spite of the presence of two or three sulpho groups in the molecule, and it is very surprising that such chrome prints on cotton are very fast to light.

In order that the invention may be fully understood and readily carried into effect some specific examples will now be given, the parts being by weight.

Example I 22.3 parts of 1.5-napthylamine sulphonic acid suspended in 200 parts of water are, after addition of 12 parts of concentrated hydrochloric acid of 30% strength, diazotized with 6.9 parts of sodium nitrite and then mixed with a solution of 22.3 parts of 1.6-napthylamine sulphonic acid in 250 parts of water. After completion of the coupling, the mass is neutralize with 4 parts of caustic soda, 7 parts of sodium nitrite are added thereto and the whole is allowed to run into 35 parts of hydrochloric acid of 30% strength, diluted with 200 parts of water, at 15° C. The diazocompound is precipitated by common salt and pressed, then treated with 150 parts of water and 150 parts of ice, whereupon 14 parts of salicylic acid in form of its dissolved sodium salt are added and 30 parts of caustic soda of 20% strength allowed to run in slowly. After completion of the coupling, the mass is neutralized with 10 parts of acetic acid and the dyestuff is salted out by means of common salt.

The dyestuff has the formula:

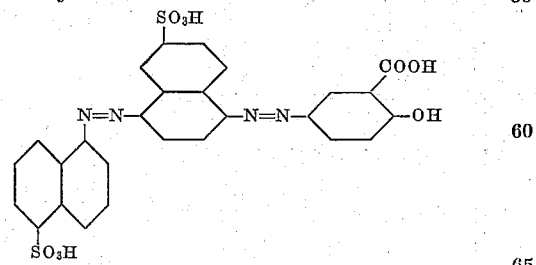

and constitutes a brown powder, soluble in water with a yellow brown coloration, which turns to violet by addition of caustic soda, whilst the solution in concentrated sulphuric acid is colored blue green. In the chromium print on cotton there is obtained a brown which is notably fast to soap, washing and light.

Example II 30.3 parts of 1-naphthylamine-4.7-disulphonic acid are diazotized in a suspension with 270 parts of water after addition of 12 parts of hydrochloric acid of 30% strength, by means of 6.9 parts of sodium nitrite and then treated with a solution of 22.3 parts of 1.7-naphthylamine sulphonic acid in 250 parts of water. After completion of the coupling there are added 4 parts of caustic soda, then 7 parts of sodium nitrite and thereupon rapidly mixed at 10° C. with 35 parts of hydrochloric acid. When the diazotizing is completed there are added 14 parts of salicyclic acid in form of its dissolved sodium salt and a further 40 parts of caustic soda of 20% strength are allow to run in. The dyestuff is precipitated by means of common salt. It has the formula:

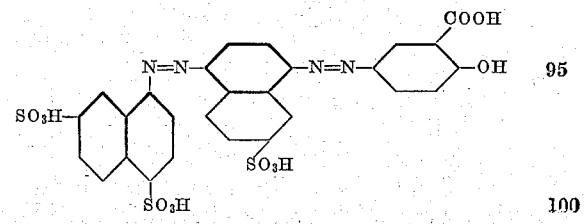

Dried it forms a brown powder, soluble in water with a yellow brown coloration, which with caustic soda turns to violet. Its solution in concentrated sulphuric acid is blue green.

Printed on cotton with chromium mordant it yields a brown prominently fast to light, washing and soap.

Similar dyestuffs are obtained if in this example there is used as initial component in place of the disulphonic acid of 1-naphthylamine, a 2-naphthylamine disulphonic acid.

In the above examples the salicylic acid may be replaced by the ortho- or meta-cresotinic acid.

What I claim is:—

1. A process for the production of mordant disazo dyestuffs, consisting in diazotizing hydroxyl-free aminosulphonic acids of the naphthalene series, coupling the diazotized body with a sulphonic acid of 1-naphthylamine to form an intermediate product, then further diazotizing the latter and finally coupling same with an orthohydroxy carboxylic acid of the benzene series.

2. A process for the production of mordant disazo dyestuffs, consisting in diazotizing polysulphonic acids of hydroxyl-free amines of the naphthalene series, coupling the diazotized body with a sulphonic acid of 1-naphthylamine to form an intermediate product, then further diazotizing the latter and finally coupling same with an orthohydroxycarboxylic acid of the benzene series.

3. A process for the production of mordant disazo dyestuffs, consisting in diazotizing hydroxyl-free amino-sulphonic acids of the naphthalene series, coupling the diazotized body with a sulphonic acid of 1-naphthylamine to form an intermediate product, then further diazotizing the latter and finally coupling same with salicylic acid.

4. A process for the production of mordant disazo dyestuffs, consisting in diazotizing polysulphonic acids of hydroxyl-free amines of the naphthalene series, coupling the diazotized body with a sulphonic acid of 1-naphthylamine to form an intermediate product, then further diazotizing the latter and finally coupling same with salicylic acid.

5. A process for the production of mordant disazo dyestuffs, consisting in diazotizing hydroxyl-free amino-sulphonic acids of the naphthalene series, coupling the diazotized body with 1.6-naphthylamine sulphonic acid to form an intermediate product, then further diazotizing the latter and finally coupling same with an orthohydroxycarboxylic acid of the benzene series.

6. A process for the production of mordant disazo dyestuffs, consisting in diazotizing hydroxyl-free amino-sulphonic acids of the naphthalene series, coupling the diazotized body with 1.6-naphthylamine sulphonic acid to form an intermediate product, then further diazotizing the latter and finally coupling same with salicylic acid.

7. As new articles of manufacture, the hereinbefore described mordant disazo dyestuffs having the general formula

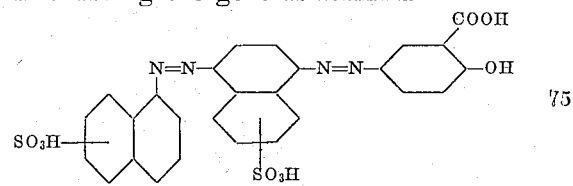

said disazo dyestuffs constituting brown powders soluble in water and yielding brown chromium prints of great fastness to soap, washing and light.

In witness whereof I have hereunto signed my name this 25th day of January, 1929.

LEOPOLD OSWALD.